United States Patent
Feyh et al.

(10) Patent No.: US 9,816,865 B2
(45) Date of Patent: Nov. 14, 2017

(54) SYSTEM AND METHOD FOR REMOTE TEMPERATURE MEASUREMENTS IN A HARSH ENVIRONMENT

(71) Applicant: Robert Bosch GmbH, Stuttgart (DE)

(72) Inventors: Ando Feyh, Reutlingen (DE); Gary O'Brien, Palo Alto, CA (US); Joel Oudart, Sunnyvale, CA (US); Nikhil Ravi, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 14/529,632

(22) Filed: Oct. 31, 2014

(65) Prior Publication Data
US 2015/0117490 A1    Apr. 30, 2015

Related U.S. Application Data

(60) Provisional application No. 61/897,852, filed on Oct. 31, 2013.

(51) Int. Cl.
*G01J 5/04*    (2006.01)
*F01N 11/00*    (2006.01)
(Continued)

(52) U.S. Cl.
CPC ............ *G01J 5/048* (2013.01); *F01N 11/002* (2013.01); *G01J 5/0014* (2013.01); *G01J 5/0887* (2013.01);
(Continued)

(58) Field of Classification Search
CPC .................................. G01J 5/022; G01J 5/042
(Continued)

(56) References Cited

U.S. PATENT DOCUMENTS 4,525,080 A * 6/1985 Smith .................. G01J 5/0044
374/115
5,277,496 A * 1/1994 Mayer .................. G01J 5/0014
250/338.1
(Continued)

FOREIGN PATENT DOCUMENTS

JP      52038980 A *  3/1977
JP   WO 2014021140 A1 *  2/2014 ............ G01J 5/0014

OTHER PUBLICATIONS

Gardiner et al, "Cycle-by Cycle Exhaust Temperature Monitoring for Detection of Misfiring and Combustion Instability in Reciprocating Engines", Proceeding of the ASME Internal Combustion Engine Division 2007 Fall Technical Conference, 2007.*

*Primary Examiner* — Minh Phan
*Assistant Examiner* — Leon W Rhodes, Jr.
(74) *Attorney, Agent, or Firm* — Maginot Moore & Beck LLP

(57) ABSTRACT

A temperature sensing device includes a probe unit on a first end and a sensor unit on a second end opposite the first end. The first end is introduced into an environment to be measured, such as an exhaust gas line from a combustion engine, and the second end is positioned in a region outside of the environment such that the sensor unit is at least partially insulated from a temperature of the environment. The probe unit, exposed to the temperature of the environment, achieves a temperature that corresponds to the temperature of the environment. The sensor unit is operable to sense the temperature of the probe unit and generate a corresponding electrical signal usable to determine a sensed temperature of the environment. The temperature of the environment can be determined on a cycle-by-cycle basis, and is usable for implementing advanced combustion strategies such as HCCI and SACI.

18 Claims, 3 Drawing Sheets

(51) Int. Cl.
*G01J 5/00* (2006.01)
*G01J 5/08* (2006.01)

(52) U.S. Cl.
CPC .. *F01N 2560/06* (2013.01); *F01N 2900/1404* (2013.01); *Y02T 10/47* (2013.01)

(58) Field of Classification Search
USPC ........................................................ 374/126
See application file for complete search history.

(56) References Cited

U.S. PATENT DOCUMENTS

| | | | | |
|---|---|---|---|---|
| 5,364,186 A * | 11/1994 | Wang | ................ | G01J 5/04 374/126 |
| 6,637,931 B2 * | 10/2003 | Lee | ................ | G01J 5/16 374/130 |
| 7,445,384 B2 * | 11/2008 | Van Der Maat | ....... | B22D 2/006 266/265 |
| 2009/0206264 A1 * | 8/2009 | Twiney | ................ | G01J 5/041 250/353 |

* cited by examiner

SYSTEM AND METHOD FOR REMOTE TEMPERATURE MEASUREMENTS IN A HARSH ENVIRONMENT

CROSS REFERENCE

This disclosure claims the benefit of U.S. Provisional Application No. 61/897,852 filed Oct. 31, 2013, the entire contents of which is incorporated herein by reference.

TECHNICAL FIELD

This disclosure relates generally to the field of temperature measurement, and, more particularly, to temperature sensors for measuring a temperature in a harsh environments.

BACKGROUND

Temperatures are measured in many industrial and commercial systems and processes to provide desired conditions in which the systems and processes operate. By accurately measuring the temperatures of the systems and industrial processes, the associated equipment can operate at an optimum efficiency. Temperature measurements made for a combustion engine can be particularly critical, since the efficiency of the engine can be directly related to the temperature at which the engine operates.

Some applications for temperature sensing present a harsh or extreme environment which can affect the capability of a temperature sensor to accurately determine a temperature. For example, in some types of combustion engines, the temperature of the engine exhaust can provide an accurate indicator of the operating conditions of the engine. However, due to the harsh environment of the exhaust gas, the temperature sensing systems and the temperature sensors themselves, require robust packaging to prevent the extreme environment from affecting the temperature measurement. Highly complex packaging to protect the system or sensor can be required. Unfortunately, packaging of this type, while effective, can be costly or complex. In addition, additional electrical circuitry and the associated wiring may be needed to transmit the electrical temperature signals in an extreme environment. As a result, there are a relatively few number of currently available temperature sensors which can be used for such extreme applications.

Commercially available temperature sensors are known which measure temperatures at predetermined discrete periods of time, typically on the order of every few seconds or more. Such discrete measurement time periods can be too long for certain types of applications, and are therefore not suitable for fast, cycle-by-cycle temperature measurements. In particular, discrete time measurements, on the order of every few seconds, are not useful for control of advanced combustion strategies such as Homogeneous Charge Compression Ignition (HCCI) and Spark Assisted Compression Ignition (SACI) used in combustion engines.

Therefore, there is a need for a fast temperature sensor that is usable in harsh or extreme environments without requiring complex packaging.

SUMMARY

The following is a brief summary of subject matter that is described in greater detail herein. This summary is not intended to be limiting as to the scope of the claims.

Using an infrared based temperature sensor, the temperature of gases in a harsh environment such as the engine exhaust can be measured remotely on a cycle-by-cycle basis, without the need for complex packaging and costly wiring/electrical connections to the outside environment. The temperature inside the environment is measured using a sealed probe. The sealed probe is substantially at the same temperature as the environment and the temperature of the sealed probe is measured using an infra-red temperature sensor. This enables the sensor element to be placed physically apart from the high temperature environment such as a region in the path of exhaust gas. Therefore, conventional packaging and standard signal conditioning can be applied. The infrared based sensor advantageously has a time constant in the order of milliseconds, allowing very fast measurements of temperature. The described system, method, and device are effectively usable in automotive applications, as well as a wide variety of industrial uses.

In one embodiment, a temperature sensing device includes a probe unit and a sensor unit. The probe unit is configured to be positioned within an environment such that a temperature of the probe unit corresponds to a temperature of the environment. The sensor unit is spaced apart from the probe unit such that when the probe unit is positioned within the environment, the sensor unit is not positioned within the environment. The sensor unit is configured to sense the temperature of the probe unit, and generate an electrical signal indicative of the sensed temperature of the probe unit.

In one aspect of the disclosure, the device further includes a sealed housing that has a first end, a second end opposite the first end, and an interior between the first end and the second end. The probe unit closes off the first end of the housing such that the interior of the housing is sealed off from the environment. The sensor unit is mounted on a side of the second end that faces the interior.

In an embodiment, a surface of the interior of the housing is configured to reflect at least a portion of radiation emitted by the probe unit towards the sensor unit. In one embodiment, the housing includes a metal. In one aspect, the housing has a substantially tube-like shape. In one embodiment, a portion of the housing that includes the first end but does not include the second end is configured to be inserted into a pipe, such as an exhaust pipe configured to exhaust gas from an engine.

In an embodiment, the sensor unit includes at least one sensor mounted to the side of the second end that faces the interior via a spacer positioned in a cavity of the second end of the housing. The spacer is configured to at least partially insulate the at least one sensor from the temperature of the environment.

In a further embodiment, the probe unit includes a metallic film with a high thermal conductivity such that changes in the temperature of the environment that are small in magnitude relative to a magnitude of the temperature of the environment induce a change in the temperature of the probe unit that is detectable by the sensor unit.

In a further aspect, the probe unit emits infra-red radiation with reference to the temperature of the probe unit. The sensor unit includes an infra-red sensor configured to sense the infra-red radiation emitted by the probe unit, and the electrical signal generated by the sensor unit is generated with reference to the sensed infra-red radiation. In an embodiment, the probe unit includes a carbon preconditioning.

In another aspect, the temperature sensing device has a time constant in the order of milliseconds.

A temperature measuring system for use with an engine that has an exhaust pipe configured to exhaust gas generated by the engine includes a temperature sensing device as described above that is operatively connected to a processor configured to determine a sensed temperature of the exhaust gas with reference to the electrical signal. An engine controller is operatively connected to the processor and the engine, and is configured to control the engine with reference to the sensed exhaust gas temperature on a cycle-by-cycle basis.

In an embodiment, the probe unit is configured such that a change in the temperature of the environment induces a change in the temperature of the probe within a time period on the order of milliseconds. The determination of the sensed temperature of the environment can be repeated for at least one following time period in order to collect cycle-by-cycle data of the temperature of the environment that is usable to facilitate advanced combustion strategies such as Homogeneous Charge Compression Ignition (HCCI) and Spark Assisted Compression Ignition (SACI).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
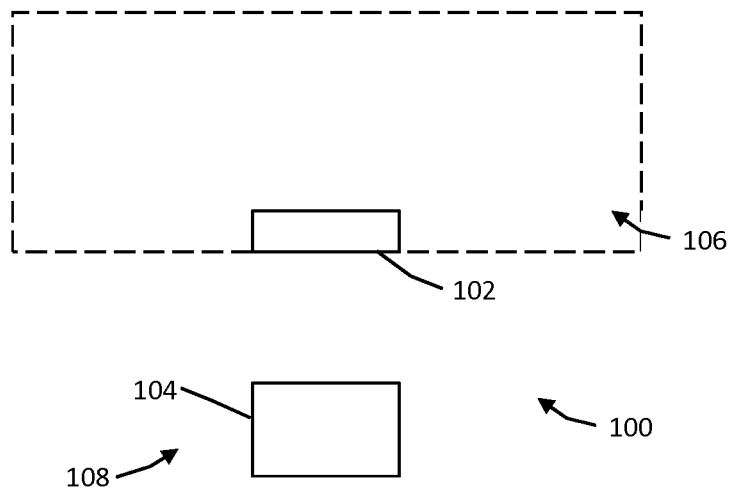
FIG. 1 is a schematic block diagram of a temperature sensing device according to the disclosure.

FIG. 1 is a schematic block diagram of a temperature sensing device 100 according to the disclosure. The device 100 includes a probe unit 102 and a sensor unit 104. The probe unit 102 is positioned such that it is located substantially within an environment 106 to be measured. The probe unit 102 is exposed to a temperature of the environment 106, and is configured to achieve a temperature that corresponds to the temperature of the environment. The sensor unit 104 is positioned such that it is located in a region 108 outside of the environment 106. Consequentially, the sensor unit 104 is at least partially insulated from the temperature of the environment 106.

The sensor unit is configured to sense the temperature of the probe unit 102, and is further configured to generate an electrical signal indicative of the temperature of the probe unit 102. In an embodiment, the probe unit is configured to absorb heat from the environment 106 and emit infra-red radiation in response to the temperature of the environment 106, whereby the infra-red radiation is at least partially directed at the sensor unit 104. The sensor unit is configured to detect the infra-red radiation generated from the heat absorbed by the probe unit 102 from the environment 106.

In one aspect of the disclosure, the environment 106 is a harsh or extreme environment having a high temperature relative to a temperature of the region 108 outside of the environment 106. Since the temperature of the region 108 is low compared to the temperature of the environment 106, infra-red emissions from the region 108 do not have a significant effect on temperature measurements of the sensor unit 104. Additionally, any excess heat retained by the probe unit 102, for example when the temperature of the environment drops, can be dissipated into the region 108 or the environment 106. Advantageously, because the sensor unit 104 is spaced apart from the environment 106, conventional electronic connection and packaging practices are usable for providing the sensor unit 104 in the device 100 without a risk of damage or inaccurate measurements.

Figure 2:
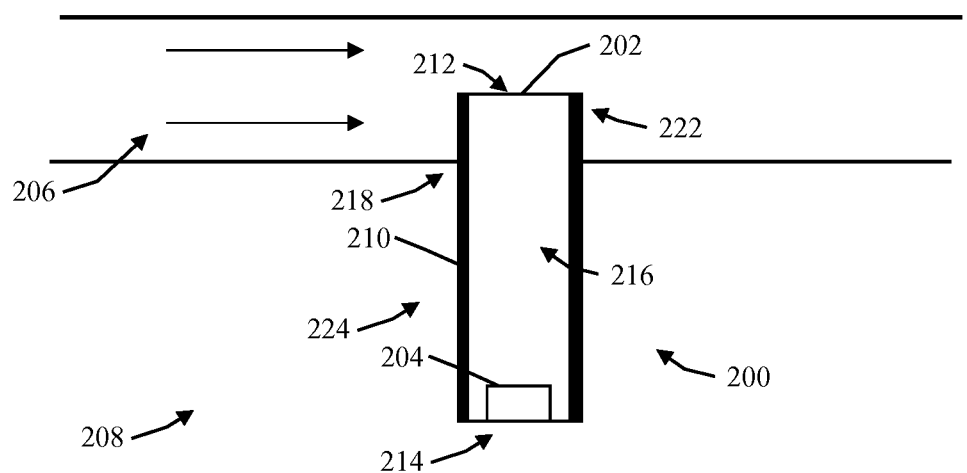
FIGS. 2-4 are schematic illustrations of different embodiments of temperature sensing devices according to the disclosure.

FIG. 2 illustrates an exemplary embodiment of a temperature sensing device 200 that includes a housing 210, a probe unit 202, and a sensor unit 204. The probe unit 202 closes off a first end 212 of the housing 210, and the sensor unit 204 is mounted on a side of a second end 214 of the housing 210 that faces an interior 216 of the housing 210 defined by the first end 212 and the second end 214. In an embodiment, the housing 210 is a hollow tube having a substantially cylindrical shape, although other shapes for the housing 210 are also contemplated. The device 200 is positioned such that a first portion 222 that includes the probe unit 202 is positioned within an environment 206 that is desirably measured, and such that a second portion 224 that includes the sensor unit 204 is positioned in a region 208 outside of the environment 206. In one aspect, the interior 216 of the housing 210 is sealed off from at least one of the environment 206 and the region 208 such that, for example, gasses, debris, or other materials are prevented from entering the interior 216 that might otherwise contaminate or damage the sensor unit 204.

In an example, the environment 206 is a pipe directing a hot fluid, such as an exhaust pipe directing exhaust gas away from an engine. The housing 210 thus extends through an aperture 218 in a wall of the pipe 206. The first portion 222 extends into the exhaust pipe 206 such that the probe unit 202 is located substantially in a middle of a channel defining a flow path of the pipe 206, although other locations are also contemplated. In an embodiment, the probe unit 202 is located beyond a laminar boundary region of gas flowing within the pipe 206. Because the second portion 224 is located outside of the flow path of the pipe 206, the second portion 224, and thereby the sensor unit 204, is at least partially insulated from the exhaust gas in the pipe 206.

At least the second portion 224 of the housing 210 advantageously is configured to have a sufficient mass, surface area, and thermal conductivity such that the housing 210 maintains a relatively stable temperature when exposed to the temperature of the region 208 outside of the environment 206. Because the housing 210 is in a substantially steady-state condition, excess latent heat in the probe unit can promptly dissipate, since a temperature of the housing 210 is lower than a temperature of the environment 206. This enables sub-second oscillations in the temperature of the environment to induce detectable changes in the temperature of the probe unit 202. The housing 210 also at least partially insulates the sensor unit 202, and thus further enables use of conventional electronic connection and packaging practices without risking damage or inaccurate measurements.

Figure 3:
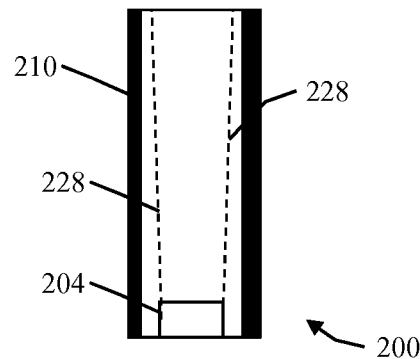
Figure 4:
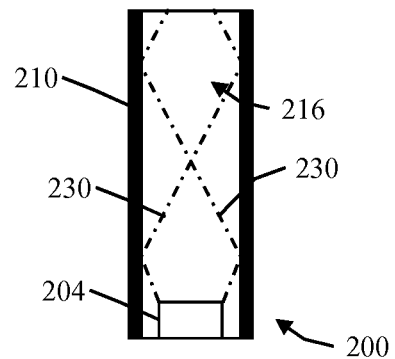

In an example, the probe unit emits infra-red radiation due to its temperature, and the sensor unit 204 includes an infra-red sensor configured to detect infra-red radiation within a certain detection angle relative to the sensor. FIG. 3 illustrates an exemplary embodiment of the device 200 wherein the sensor unit 204 has a narrow detection angle illustrated by the detection lines 228, which extend from the sensor unit 204 but do not touch the housing 210. FIG. 4 illustrates an exemplary embodiment wherein the housing 210 includes a reflective material such that at least a portion of infra-red radiation emitted by the probe unit 202 is reflected along the interior 216 by the reflective material in the housing 210 and is directed towards the sensor unit 204, which has a wide detection angle as illustrated by the detection lines 230 which impinge upon and are reflected by the housing 210. In an example, the housing 210 includes a metal. In another example, the interior 216 of the housing 210 is coated or lined with a reflective material.

Figure 5:
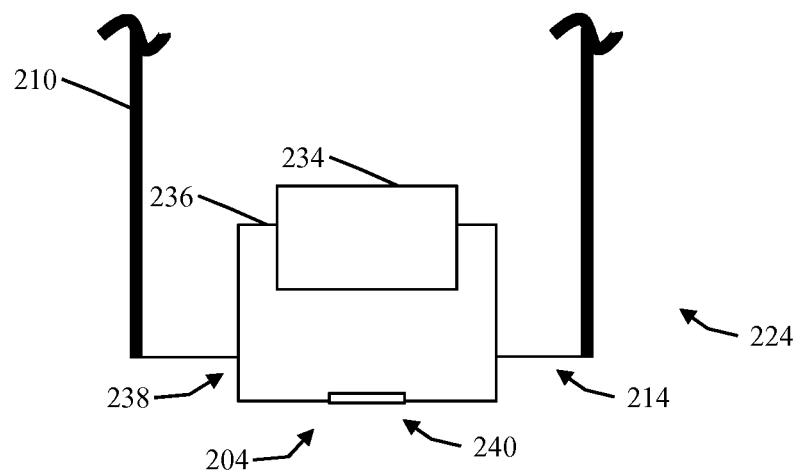
FIG. 5 is a schematic illustration of a sensor portion of a temperature sensing device according to the disclosure.

FIG. 5 illustrates an exemplary embodiment of the second portion 224 of the housing 210. As illustrated in FIG. 5, the sensor unit 204 includes an infra-red sensor 234 mounted onto the side of the second end 214 via a spacer 236 and configured to generate the electrical signal indicative of the temperature of the probe unit 202. In an example, the spacer 236 is inserted into and thus closes off a cavity 238 in of the second end 214 of the housing 210. As examples, the spacer 236 may be press-fitted, screwed into, snapped, welded, glued, or bolted to the housing 210. In particular, the spacer 236 can include threads configured to mate and engage with corresponding threads located along the cavity 238, although any suitable method of mounting the spacer 236 within the housing 210 may be used.

In one aspect, the spacer 236 includes an insulating material and is configured to at least partially insulate the sensor 234 from high temperatures. In an example, the spacer 236 includes a material such as, for example, a ceramic, a plastic, or glass. In one aspect, the spacer 236 further includes an electronic connection 240 that is configured to electronically connect the sensor 234 to, for example, a processor (see, e.g., the processor 306 in FIG. 7) for determining a sensed temperature of the environment 206 that corresponds to the electrical signal generated by the sensor 234. In other embodiments, an electrical connection for connecting the sensor 234 passes through an aperture in the housing 210.

Installation of the device 200 can be accomplished, for example, by inserting the housing 210 into the aperture 218 of the pipe 206 (FIG. 2), and then inserting the spacer 236 with the sensor 234 mounted thereon into the cavity 238 in the housing 210 (FIG. 5). Other installation processes are also contemplated, including wherein the sensor unit 204 is included within the housing 210 prior to installing the housing 210 in a desired location.

Figure 6:
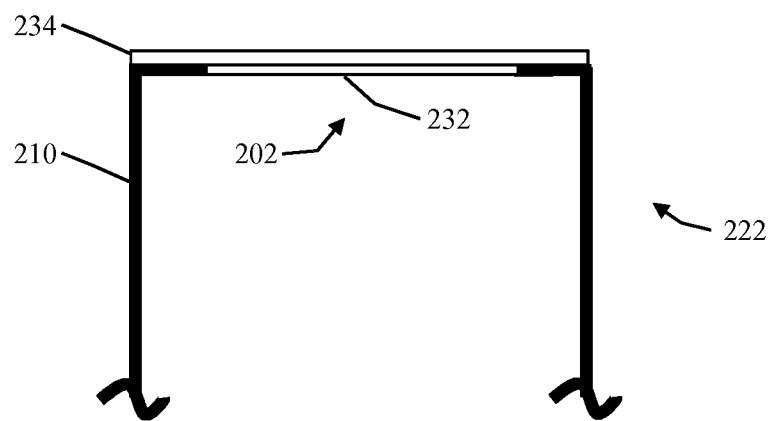
FIG. 6 is a schematic illustration of a probe portion of a temperature sensing device according to the disclosure.

FIG. 6 illustrates an exemplary embodiment of the first portion 222 of the housing 210. In one aspect, the probe unit 202 includes a thin metallic film 232 that has a high thermal conductivity such that changes in the temperature of the environment 206 (FIG. 2) that are small in magnitude relative to a magnitude of the temperature of the environment 206 induce a change in the temperature of the probe unit 202 that is detectable by the sensor unit 204. In other words, the thin metallic film 232 has a low time constant for heat absorption/radiation, such that the temperature of the probe unit 202 tracks the temperature of the exhaust gas, even for sub-second temperature fluctuations such as temperature changes occurring within a time period on the order of milliseconds.

Because the first portion 222 of the housing 210 is located within the environment 206, in some embodiments, material from the environment 206 can build up on the first portion 222 or the probe unit 202. For example, under some conditions, soot particulates from exhaust gasses can accumulate so as to completely cover the first portion 222 or the probe unit 202. Advantageously, such soot particulate accumulation does not impact performance of the device 200, and can even improve heat absorption by the probe unit 202.

In an embodiment, the first portion 222 includes a preconditioner 234, such as a layer of carbon or soot disposed over outside surfaces of the probe unit 204 or the first portion 222 which are exposed to the environment 206. The preconditioner 234 facilitates stable heat absorption characteristics over time.

Figure 7:
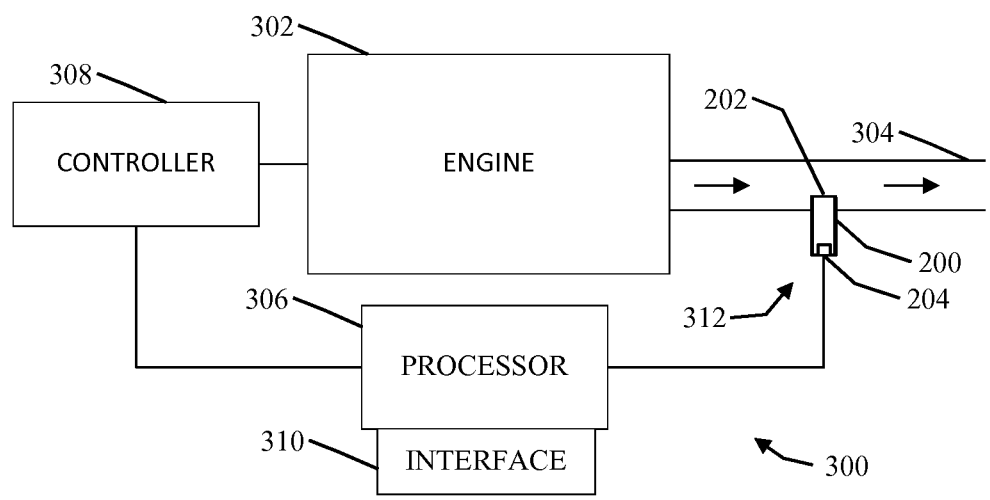
FIG. 7 is a schematic block diagram of a temperature measuring system according to the disclosure.

FIG. 7 illustrates a schematic block diagram of a temperature measuring system 300 for use with an engine 302 having an exhaust pipe 304 configured to exhaust gas generated by the combustion engine 302. The engine 302 can be, for example, a combustion engine, a compression engine, or combinations thereof. The system 300 includes a temperature sensing device 200 (FIG. 2) that is positioned within the exhaust pipe 304 as described above, and is operable to determine a temperature of exhaust gas exhausted from the engine 302 through the exhaust pipe 304.

The temperature sensing device 200 includes a sensor unit 204 that generates an electronic signal indicative of a temperature of a probe unit 202, and is operatively connected to a processor 306 via an electrical connection 312. The processor 304 is configured to determine a sensed temperature of the exhaust gas in the exhaust pipe 304 with reference to the electronic signal generated by the sensor unit 204. The processor 306 is also operatively connected to an engine controller 308, and is configured to provide the engine controller 308 with exhaust gas temperatures and other information such as changes to exhaust gas temperatures over time.

In an embodiment, the system 300 also includes an interface 310 operatively coupled to the processor 306, and configured to provide input of additional information to the processor 306. In an example, the interface 310 is a user interface by which a user can select one or more settings.

The engine controller 308 is operatively connected to the engine 302, and is configured to control the engine 302 with reference to information provided by the processor 306. In one aspect, the processor is configured to determine temperatures of the exhaust gas on a cycle-by-cycle basis, wherein each cycle is a time period on the order of milliseconds. The engine controller 308 is further configured to control the engine 302 on a cycle-by-cycle basis. Cycle-by-cycle measurements facilitate implementation via the engine controller 308 of advanced combustion strategies such as Homogeneous Charge Compression Ignition (HCCI) and Spark Assisted Compression Ignition (SACI).

While the operative connections between components of the system 300 are illustrated as lined connections, it should be understood that such connections can be, for example, hard-wired connections, wireless connections transmitted via, for example, an antenna and receiver, or combinations thereof.

While several embodiments are described above for sensing the temperature of exhaust gasses exhausted from an engine, it should be appreciated that the temperature sensing device described above is usable in a wide variety of applications that involve a harsh or extreme environment that may otherwise damage a conventional sensor or which requires measuring the temperature of the environment in time periods on the order of milliseconds. For example, the temperature sensing device disclosed herein may be used in applications for power plants, distilleries, chemical plants, oil wells, and other industrial and mechanical applications.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those of ordinary skill in the art that are also intended to be encompassed by the disclosure.

What is claimed is:

1. A temperature sensing device, comprising:
a housing that includes:
a first end portion; and
a second end portion opposite the first end portion, the first and second end portion defining an interior of the housing, and the second end portion defining a hole that extends therethrough;
the housing configured to be arranged with the first end portion located within an environment to be measured and the second end portion located outside the environment;
a spacer closing off the hole and including:
an insulating material; and
at least one electrical connection that provides an electrical connection point outside of the housing;
a probe unit that is attached to the first end portion and that is configured to be exposed to the environment when the first end portion is located within the environment such that a temperature of the probe unit corresponds to a temperature of the environment;
a carbon preconditioner disposed on an outside surface of the probe unit to be exposed to the environment; and
a sensor unit that is operatively connected to the at least one electrical connection and that is supported by the spacer such that the sensor unit is spaced apart from the housing, and such that the insulating material of the spacer thermally insulates the sensor unit from the housing;
the sensor unit spaced apart from the probe unit with the interior positioned therebetween such that the sensor unit is configured to be positioned outside of the environment when the first end portion is located within the environment; and
the sensor unit being further configured to:
sense the temperature of the probe unit; and
generate an electrical signal indicative of the sensed temperature of the probe unit.

2. The temperature sensing device of claim 1, wherein the interior of the housing is sealed off from at least one of the environment and the region outside of the environment.

3. The temperature sensing device of claim 1, wherein:
the probe unit is configured to emit radiation based on the temperature of the probe unit; and
a surface of the interior of the housing is configured to reflect at least a portion of the radiation emitted by the probe unit towards the sensor unit.

4. The temperature sensing device of claim 1, wherein the housing includes a metal.

5. The temperature sensing device of claim 1, wherein the housing has a substantially tube-like shape.

6. The temperature sensing device of claim 1, wherein:
the environment is a fluid flowing through a pipe; and
the first end portion is configured to be inserted into the pipe.

7. The temperature sensing device of claim 1, wherein the probe unit includes a metallic film with a high thermal conductivity such that the temperature of the probe unit tracks the temperature of the environment with a response that is within the order of milliseconds.

8. The temperature sensing device of claim 1, wherein:
the probe unit is configured to emit radiation based on the temperature of the probe unit;
the sensor unit includes an infra-red sensor configured to sense the infra-red radiation emitted by the probe unit; and
the electrical signal generated by the sensor unit is generated with reference to the sensed infra-red radiation.

9. The temperature sensing device of claim 1, wherein the sensor unit is configured to connect, via the electrical connection, with a processor configured to determine a sensed temperature of the environment with reference to the electrical signal generated by the sensor unit.

10. The temperature sensing device of claim 1, wherein the temperature sensing device has a time constant in the order of milliseconds.

11. The temperature sensing device of claim 1, wherein the insulating material includes at least one of a ceramic material, a plastic material, and a glass material.

12. The temperature sensing device of claim 1, wherein the carbon preconditioner includes soot.

13. A temperature measuring system for use with an engine having an exhaust pipe configured to exhaust gas generated by the engine, comprising:
a temperature sensing device that includes:
a housing having:
a detection end that is at least partially inserted into the exhaust pipe; and
a sensor end that is outside of the exhaust pipe, the detection end and the sensor end defining an interior, and the sensor end defining a hole that extends therethrough;
a spacer closing off the hole and including:
an insulating material; and
at least one electrical connection that provides an electrical connection point outside of the housing;
a probe unit that closes off the detection end of the housing such that the probe unit is exposed to exhaust gas flowing through the exhaust pipe, and that is configured to have a temperature that tracks a temperature of the exhaust gas;
a carbon preconditioner disposed on an outside surface of the probe unit to be exposed to the environment; and
a sensor unit that is operatively connected to the at least one electrical connection and that is supported by the spacer such that the sensor unit is spaced apart from the housing, and such that the insulating material of the spacer thermally insulates the sensor unit from the housing, and that is configured to:
sense the temperature of the probe unit; and generate an electrical signal indicative of the sensed temperature of the probe unit;
a processor that is electronically connected to the sensor unit via the electrical connection of the spacer, and that is configured to determine a sensed temperature of the exhaust gas with reference to the electrical signal; and
an engine controller that is operatively connected to the processor and the engine, and that is configured to control the engine with reference to the sensed exhaust gas temperature on a cycle-by-cycle basis.

14. A method of sensing a temperature, the method comprising;
introducing a first end portion of a housing of a temperature sensing device into an environment to be measured, the first end portion having a probe unit that closes off the end portion of the housing, and a carbon preconditioner disposed on an outside surface of the probe unit so as to be exposed to the environment;
positioning a second end portion of the housing into a region outside of the environment, the second end portion being opposite the first end portion and defining a hole that extends therethrough, wherein a spacer closes off the hole, and wherein a sensor unit is supported by the spacer such that the sensor unit is spaced apart from the housing, and such that an insulating material of the spacer thermally insulates the sensor unit from the housing;
exposing the probe unit to the temperature of the environment, such that a temperature of the probe unit corresponds to the temperature of the environment;
sensing, with the sensing unit, the temperature of the probe unit;
generating an electrical signal with reference to the sensed temperature of the probe unit, the electrical signal corresponding to a sensed temperature of the environment; and
transmitting the electrical signal from the sensing unit to a processor via an electrical connection of the spacer that is operatively connected to the sensor unit and that provides an electrical connection point outside of the housing.

15. The method of claim 14, wherein:
exposing the probe unit to the temperature of the environment causes the probe unit to emit infra-red radiation; and
the sensor unit includes an infra-red sensor configured to sense the infra-red radiation emitted by the probe unit in order to sense the temperature of the probe unit.

16. The method of claim 14, further comprising determining, via the processor, the sensed temperature of the environment, with reference to the electrical signal.

17. The method of claim 16, wherein:
the probe unit is configured such that a change in the temperature of the environment induces a change in the temperature of the probe within a time period on the order of milliseconds; and
the method further comprising repeating the determination of the sensed temperature of the environment for at least one following time period in order to collect cycle-by-cycle data of the temperature of the environment.

18. The method of claim 17, further comprising controlling an engine with reference to the cycle-by-cycle data.

* * * * *